United States Patent
Wu et al.

(10) Patent No.: US 10,380,965 B2
(45) Date of Patent: Aug. 13, 2019

(54) POWER CIRCUIT OF DISPLAYING DEVICE

(71) Applicant: SITRONIX TECHNOLOGY CORP., Hsinchu County (TW)

(72) Inventors: Kai-Yi Wu, Hsinchu County (TW); Kuan-Chao Liao, Hsinchu County (TW); Hung-Yu Lu, Hsinchu County (TW)

(73) Assignee: Sitronix Technology Corp., Jhubei (TW)

( * ) Notice: Subject to any disclaimer, the term of this patent is extended or adjusted under 35 U.S.C. 154(b) by 435 days.

(21) Appl. No.: 14/045,966

(22) Filed: Oct. 4, 2013

(65) Prior Publication Data
US 2015/0049008 A1  Feb. 19, 2015

(30) Foreign Application Priority Data
Aug. 19, 2013  (TW) .............................. 102129687 A

(51) Int. Cl.
| H02M 1/00 | (2006.01) |
| H02M 1/36 | (2007.01) |
| H02M 3/07 | (2006.01) |
| G09G 3/36 | (2006.01) |

(52) U.S. Cl.
CPC ......... *G09G 3/3696* (2013.01); *G09G 3/3648* (2013.01); *H02M 1/36* (2013.01); *H02M 3/07* (2013.01); *G09G 2330/02* (2013.01); *H02M 2001/0006* (2013.01)

(58) Field of Classification Search
CPC .... G05F 1/10; G09G 3/36; G09G 3/30; H03L 7/0891; H03L 7/0893; H03L 7/093
See application file for complete search history.

(56) References Cited

U.S. PATENT DOCUMENTS

| 6,278,317 B1* | 8/2001 | Hsu et al. ...................... 327/536 |
| 7,436,229 B2* | 10/2008 | Sidiropoulos ........... H03L 7/081 327/147 |
| 2006/0208775 A1* | 9/2006 | Tobita ..................... H02M 3/07 327/117 |

(Continued)

FOREIGN PATENT DOCUMENTS

| CN | 1455980 A | 11/2003 |
| CN | 1494759 A | 5/2004 |

(Continued)

*Primary Examiner* — Temesghen Ghebretinsae
*Assistant Examiner* — Paras D Karki
(74) *Attorney, Agent, or Firm* — Rosenberg, Klein & Lee

(57) ABSTRACT

The present invention relates to a power circuit of displaying device, which comprises a timing controller, a control circuit, and a charge pump (single or multiple stages). The timing controller outputs a timing control signal to the control circuit. The control circuit outputs a clock signal or a capacitance adjusting signal according to the timing control signal. The charge pump receives the input voltage and outputs an output voltage according to the clock signal or the capacitance adjusting signal. The output voltage is provided to the scan driver for generating a plurality of scan driving signals. Accordingly, by increasing the rise rate of the output voltage of the charge pump in the voltage conversion time and reducing the rise rate of the output voltage close to the voltage holding time, the present invention can achieve the effect of reducing the power consumption.

9 Claims, 11 Drawing Sheets

(56) References Cited

U.S. PATENT DOCUMENTS

| | | | |
|---|---|---|---|
| 2007/0001981 A1* | 1/2007 | Tahata | 345/98 |
| 2007/0091655 A1 | 4/2007 | Oyama et al. | |
| 2007/0126514 A1* | 6/2007 | Lin | H03L 7/0891 331/16 |
| 2007/0252791 A1* | 11/2007 | Oomori | G09G 3/3216 345/76 |
| 2008/0048765 A1* | 2/2008 | Nonaka | H02M 3/07 327/536 |
| 2008/0100600 A1* | 5/2008 | Hsueh | G09G 3/3696 345/204 |
| 2009/0115473 A1* | 5/2009 | Choi | H03L 7/0891 327/157 |
| 2009/0128212 A1* | 5/2009 | Liu | H02M 3/07 327/291 |
| 2011/0204963 A1* | 8/2011 | Kim | 327/536 |

FOREIGN PATENT DOCUMENTS

| | | |
|---|---|---|
| CN | 1661427 A | 8/2005 |
| CN | 101043180 A | 9/2007 |
| CN | 101686008 A | 3/2010 |
| CN | 102386763 A | 3/2012 |
| EP | 0766371 A2 | 4/1997 |
| JP | 2000-262044 A | 9/2000 |
| JP | 2007-74797 A | 3/2007 |
| TW | 200820188 A | 5/2008 |
| TW | 200943024 A | 10/2009 |
| TW | 201214939 A | 4/2012 |

\* cited by examiner

POWER CIRCUIT OF DISPLAYING DEVICE

FIELD OF THE INVENTION

The present invention relates to a power circuit, and particularly to a power circuit of display device.

BACKGROUND OF THE INVENTION

Many current commercial electronic devices usually require different voltage levels as power sources. Thereby, charge pumps are disposed for using existing voltages to generate different voltage levels. The charge pump circuit according to the prior art generally comprises a voltage source, at least a charging capacitor, an output capacitor, a plurality of switches, and a fixed-frequency clock for controlling multiple switches to generate different voltage levels. First, the voltage source and the charging capacitor are connected in parallel using the plurality of switches for charging the charging capacitor to a voltage level. Then, the charging capacitor is connected in series with the output capacitor. After repeated for a plurality of cycles, the voltage across the output capacitor will be raised to a voltage level much higher than the original voltage source. Nonetheless, there are many drawbacks to control the switches of the charge pump using the fixed-frequency clock.

Take the charge pumps applied in displaying devices for example. It is required by advanced portable equipment that the display technology has to meet low power consumption and high performance. In the past several years, mobile display technology has been developed rapidly; the size of displays becomes larger and the resolution becomes higher increasingly. Nonetheless, the power consumption increases as well. In addition, better user interfaces, such as graphical user interfaces and touch control, extend the usage time of mobile displaying devices. This variation demands that mobile displaying devices should be more power saving for corresponding to limited battery capacity. Thereby, the power consumption of the displaying module must be lowered, particularly for mobile displaying devices requiring continuous display of information.

In general, the driving methods of displaying devices can be divided into active and passive driving methods. No matter active or passive driving method, the scan electrode of the driving chip requires a high voltage. In order to simplify the external power circuit, a charge pump circuit is usually disposed in the power circuit. The design considerations include the loading to be driven while driving the scan electrodes. The loading includes the intrinsic capacitor of the liquid crystals and the parasitic effect as viewed by the driving stage. Normally, this loading determines the multiple and switching frequency of the voltage boosting circuit. Under the condition of not influencing the visual effect, a higher multiple and switching frequency will be set. Nonetheless, higher multiple and switching frequency reduce the voltage boosting efficiency and the voltage conversion efficiency, resulting in excess power consumption.

Please refer to FIG. 1, which shows a schematic diagram of the pulses of the scan driving signals in the scan driver according to the prior art. As shown in the figure, the scan driver according to the prior art generates a plurality of scan driving signals ($V_g$, $V_{g2}$, $V_{g3}$ ... $V_{gn}$). Because the scan driver according to the prior art is driven by a charge pump circuit of the power circuit having a fixed multiple and a fixed switching frequency for generating the plurality of scan driving signals ($V_{g1}$, $V_{g2}$, $V_{g3}$ ... $V_{gn}$), the output voltages of the charge pump circuit in the voltage conversion time and the voltage holding time of the square wave are identical. Take the scan driving signal $V_{g1}$ for example. The output voltages of the charge pump circuit in the voltage conversion time T1 and in the voltage holding time T2 of the scan driving signal $V_{g1}$ are identical.

According to the above description, because the charge pump circuit in the power circuit of the displaying device according to the prior art requires a larger multiple and frequency in the voltage conversion time of the square wave of the scan driving signal for raising the voltage to a level rapidly, the voltage boosting circuit is set to a larger multiple and switching frequency. On the other hand, the charge pump circuit of the power circuit only needs to maintain the voltage in the voltage holding time. The high multiple and switching frequency in the voltage holding time result in excess power consumption. Thereby, there is still substantial zoom for improvement for charge pump circuits using a fixed multiple and switching frequency.

Accordingly, the present invention provides a power circuit of displaying device, which reduces the switching frequency or capacitance of the charge pump in the voltage holding time for avoiding excess power consumption.

SUMMARY

An objective of the present invention is to provide a power circuit of displaying device, which uses a timing controller for improving the switching frequency or capacitance of a charge pump in the voltage conversion time of the scan driving signal for increasing the response speed of the displaying device and thus achieving the purpose of rapid charging.

Another objective of the present invention is to provide a power circuit of displaying device, which uses a timing controller for reducing the switching frequency or capacitance of a charge pump in the voltage holding time for reducing the power consumption of the displaying device and thus achieving the purpose of saving power.

A further objective of the present invention is to provide a power circuit of displaying device, which uses a level detecting unit to detect an output voltage of a charge pump for controlling the switching frequency or capacitance of the charge pump and thus achieving the purpose of saving power.

For achieving the objectives and effects described above, the present invention discloses a power circuit of displaying device, which is provided to a displaying device for generating a plurality of scan driving signal and comprises a timing controller, a control circuit, and a charge pump. The timing controller outputs a timing control signal to the control circuit. The timing of the timing control signal is related to timing of the plurality of scan driving signals of the displaying device. The control circuit outputs a clock signal or a capacitance adjusting signal according to the timing control signal. The charge pump receives an input voltage, generates an output voltage according to the clock signal or the capacitance adjusting signal, and outputs the output voltage to the scan driver, so that the scan driver can generate the plurality of scan driving signals. In addition, the clock signal determines the switching frequency of the charge pump; and the capacitance adjusting signal determines the capacitance of the charge pump.

Thereby, by improving the switching frequency or capacitance of the charge pump in a voltage conversion time of the plurality of scan driving signals, the rise rate of the output voltage of the power circuit is enhanced for facilitating the scan driver to provide a voltage having sufficient rise rate in the voltage conversion time of the scan driving signal. Besides, in the voltage holding time of the scan driving signal, the switching frequency or capacitance of the charge pump in the power circuit can be reduced for reducing the rise rate of the output voltage provided by the power circuit. Consequently, the effect of reducing power consumption can be achieved.

Moreover, the power circuit of display device according to the present invention further comprises a level detecting unit, which detects the output voltage of a charge pump and outputs a detecting signal to the control circuit according to the output voltage. The control circuit further outputs the clock signal or the capacitance adjusting signal to the charge pump according to the detecting signal for controlling the switching frequency or capacitance of the charge pump. Thereby, the present invention uses the level detecting unit to detect the output voltage of the charge pump for controlling the switching frequency or capacitance of the charge pump. Hence, the objective of saving power can be achieved.

DETAILED DESCRIPTION

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing.

In the whole specifications and subsequent claims, the word "comprising" is an open language and should be explained as "comprising but not limited to". Beside, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

In order to make the structure and characteristics as well as the effectiveness of the present invention to be further understood and recognized, the detailed description of the present invention is provided as follows along with embodiments and accompanying figures.

Figure 1:
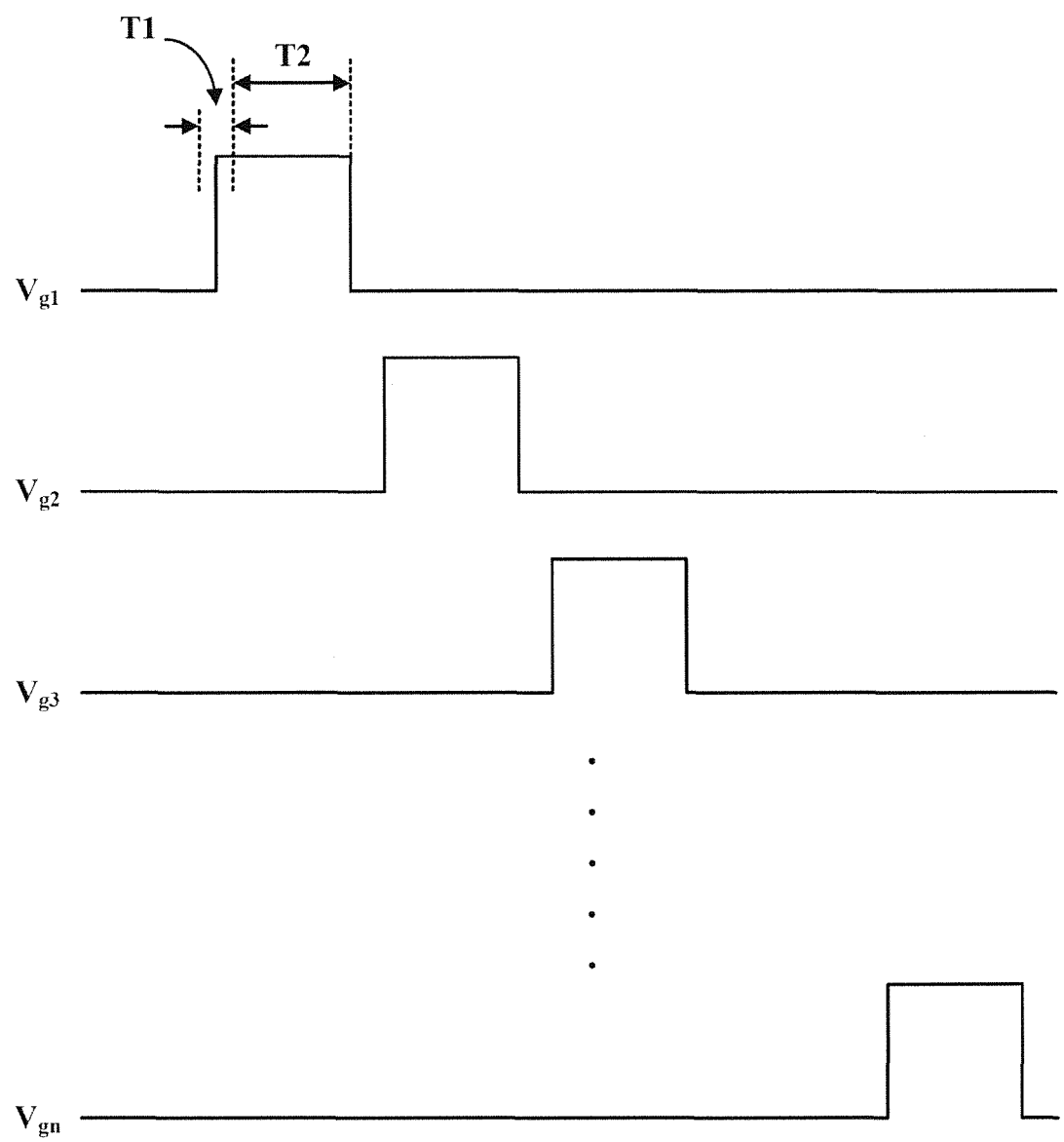
FIG. 1 shows a schematic diagram of the pulses of the scan driving signals in the scan driver according to the prior art.
Figure 2:
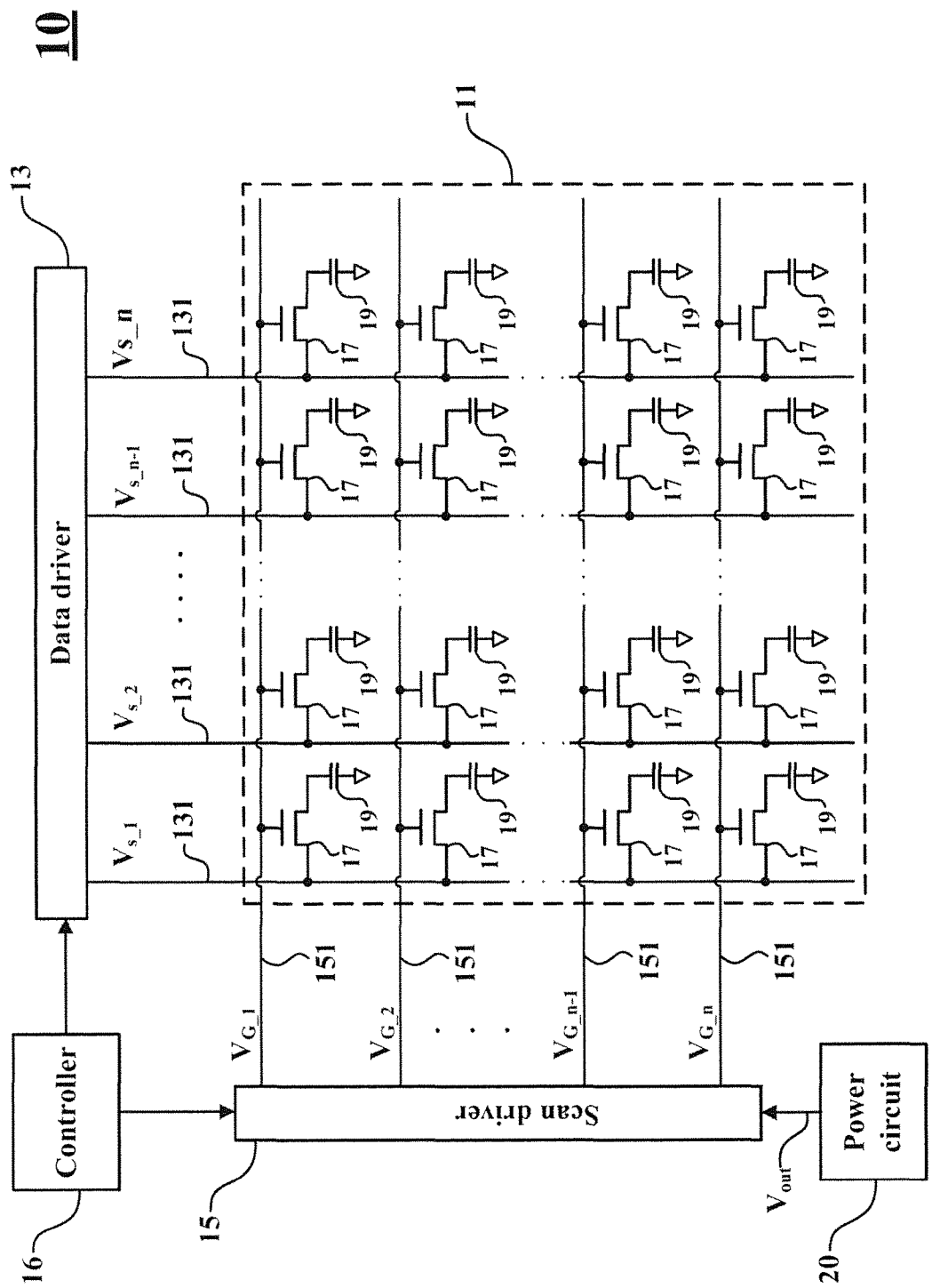
FIG. 2 shows a circuit diagram of the displaying device according to the first embodiment of the power circuit of displaying device according to the present invention.

Please refer to FIG. 2, which shows a circuit diagram of the displaying device according to the first embodiment of the power circuit of displaying device according to the present invention. As shown in the figure, the power circuit according to the present invention can be applied to various displaying devices such as thin-film transistor (TFT), twisted nematic (TN), and super twisted nematic (STN) displaying devices. The displaying device 10 comprises a panel 11, a data driver 13, a scan driver 15, a controller 16, and a power circuit 20. According to the present embodiment, the power circuit 20 of the displaying device 10 according to the present invention is applied, but not limited, to a TFT displaying device 10. The panel 11 according to the present embodiment has a plurality of TFTs 17 and a plurality of liquid crystal capacitors 19. The plurality of liquid crystal capacitors 19 are coupled to the plurality of TFTs, respectively. The gates of the plurality of TFTs 17 are coupled to the scan driver 15 via a corresponding plurality of scan lines 151, respectively; the sources of the plurality of TFTs 17 are coupled to the data driver 13 via a corresponding plurality of data lines 131, respectively.

The controller 16 is coupled to the data driver 13 and the scan driver 15. The controller 16 generates a control signal and transmits the control signal to the scan driver 15 and the data driver 13 for controlling the scan driver 15 to generate a plurality of scan driving signals ($V_{G\_1}$, $V_{G\_2}$ ... $V_{G\_n-1}$, $V_{G\_n}$) and the data driver 13 to generate a plurality of data signals ($V_{S\_1}$, $V_{S\_2}$ ... $V_{S\_n-1}$, $V_{S\_n}$) correspondingly. The data driver 13 transmits the plurality of data signals ($V_{S\_1}$, $V_{S\_2}$ ... $V_{S\_n-1}$, $V_{S\_n}$) to the sources of the plurality of TFTs 17 via the plurality of data lines 131. The scan driver 15 transmits the plurality of scan driving signals ($V_{G\_1}$, $V_{G\_2}$ ... $V_{G\_n-1}$, $V_{G\_n}$) to the gates of the plurality of TFTs 17 via the plurality of scan lines 151.

The power circuit 20 is coupled to the scan driver 15 and produces an output voltage $V_{out}$ to the scan driver 15, so that the scan driver 15 can generate the plurality of scan driving signals ($V_{G\_1}$, $V_{G\_2}$ ... $V_{G\_n-1}$, $V_{G\_n}$). In addition, another power circuit also supplies power to the data driver 13, so that the data driver 13 can generate the plurality of data signals ($V_{S\_1}$, $V_{S\_2}$ ... $V_{S\_n-1}$, $V_{S\_n}$). The principle of the power circuit is similar to the power circuit 20 of the scan driver 15. Hence, the details will not be described again.

Figure 3:
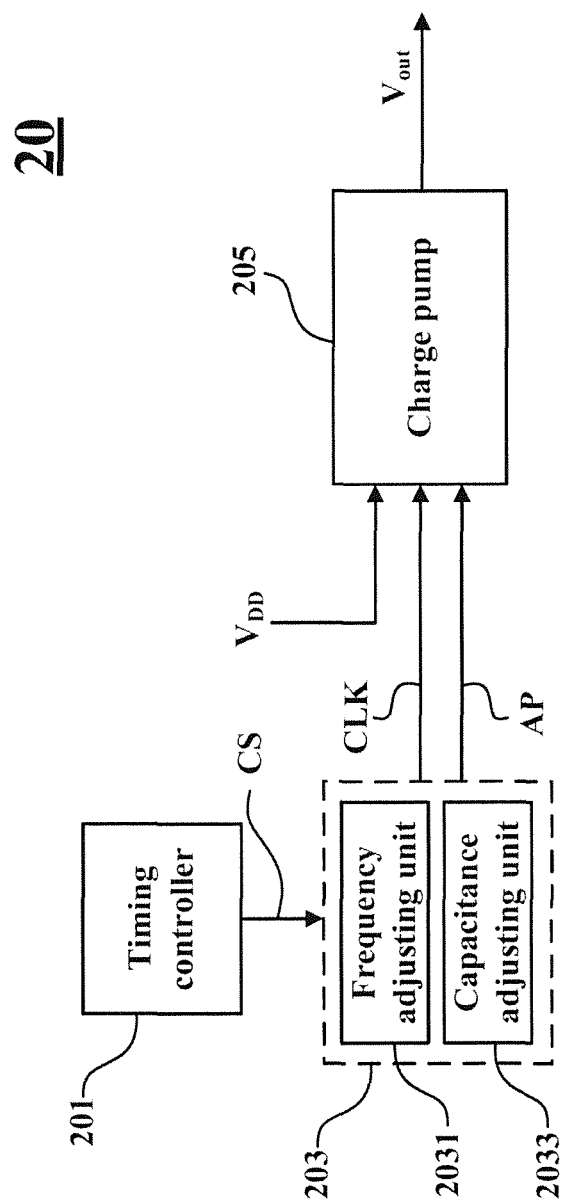
FIG. 3 shows a circuit block diagram of the power circuit of displaying device according to the first embodiment of the present invention.

Please refer to FIG. 3, which shows a circuit block diagram of the power circuit of displaying device according to the first embodiment of the present invention. As shown in the figure, the power circuit 20 comprises a timing controller 201, a control circuit 203, and a charge pump 205. The timing controller 201 outputs a timing control signal CS to the control circuit 203. The timing of the timing control signal CS is related to the timing of the plurality of scan driving signals ($V_{G\_1}$, $V_{G\_2}$ ... $V_{G\_n-1}$, $V_{G\_n}$) of the displaying device 10. The control circuit 203 outputs a clock signal CLK or a capacitance adjusting signal AP according to the timing control signal CS. The charge pump 205 receives an input voltage $V_{DD}$ for producing an output voltage $V_{out}$ according to the clock signal CLK or the capacitance adjusting signal and outputs the output voltage $V_{out}$ to the scan driver 15, so that the scan driver 15 can generate the plurality of scan driving signals ($V_{G\_1}$, $V_{G\_2}$ ... $V_{G\_n-1}$, $V_{G\_n}$) accordingly.

In other words, the control circuit 203 generates the clock signal CLK according to the timing control signal CS and transmits the clock signal CLK to the charge pump 205 for controlling the switching frequency of the switches inside the charge pump 205 and thus the rise rate $V_{out}$ of the output voltage of the charge pump 205. Alternatively, the control circuit 203 generates the capacitance adjusting signal AP according to the timing control signal CS and transmits the capacitance adjusting signal AP to the charge pump 205 for controlling the capacitance of the charging capacitors inside the charge pump 205 and thus the rise rate $V_{out}$ of the output voltage of the charge pump 205. Besides, the control circuit 203 can also transmits the clock signal CLK and the capacitance adjusting signal AP to the charge pump 205 simultaneously according to the timing control signal CS for adjusting the switching frequency and the capacitance of the charge pump 205 at the same time and thus controlling the rise rate $V_{out}$ of the output voltage of the charge pump 205.

In the above description, the clock signal CLK determines the switching frequency of the charge pump 205; the capacitance adjusting signal AP determines the capacitance of the charging capacitors inside the charge pump 205. Moreover, the switching frequency of the charge pump 205 described above corresponds to the rise rate, which is the rise rate of the output voltage $V_{out}$ from a lower level to a predetermined level, of the output voltage $V_{out}$ of the charge pump 205. The switching frequency is just the frequency at which the charge pump 205 switches the charging capacitor. As this frequency becomes higher, the charging speed of the charging capacitor is faster, and the rise rate of the output voltage $V_{out}$ will be faster as well. The capacitance of the charging capacitors inside the charge pump 205 also corresponds to the rise of the output voltage $V_{out}$. When the capacitance of the charging capacitors inside the charge pump 205 becomes larger, the rise rate of the output voltage $V_{out}$ becomes faster.

Furthermore, the control circuit 203 can include a frequency adjusting unit 2031 and a capacitance adjusting unit 2033. The frequency adjusting unit 2031 generates the clock signal CLK according to the timing control signal CS and transmits the clock signal CLK to the charge pump 205 for controlling the switching frequency of the charge pump 205. The capacitance adjusting unit 2033 generates the capacitance adjusting signal AP according to the timing control signal CS and transmits the capacitance adjusting signal AP to the charge pump 205 for controlling the capacitance of the charging capacitors inside the charge pump 205.

Figure 4:
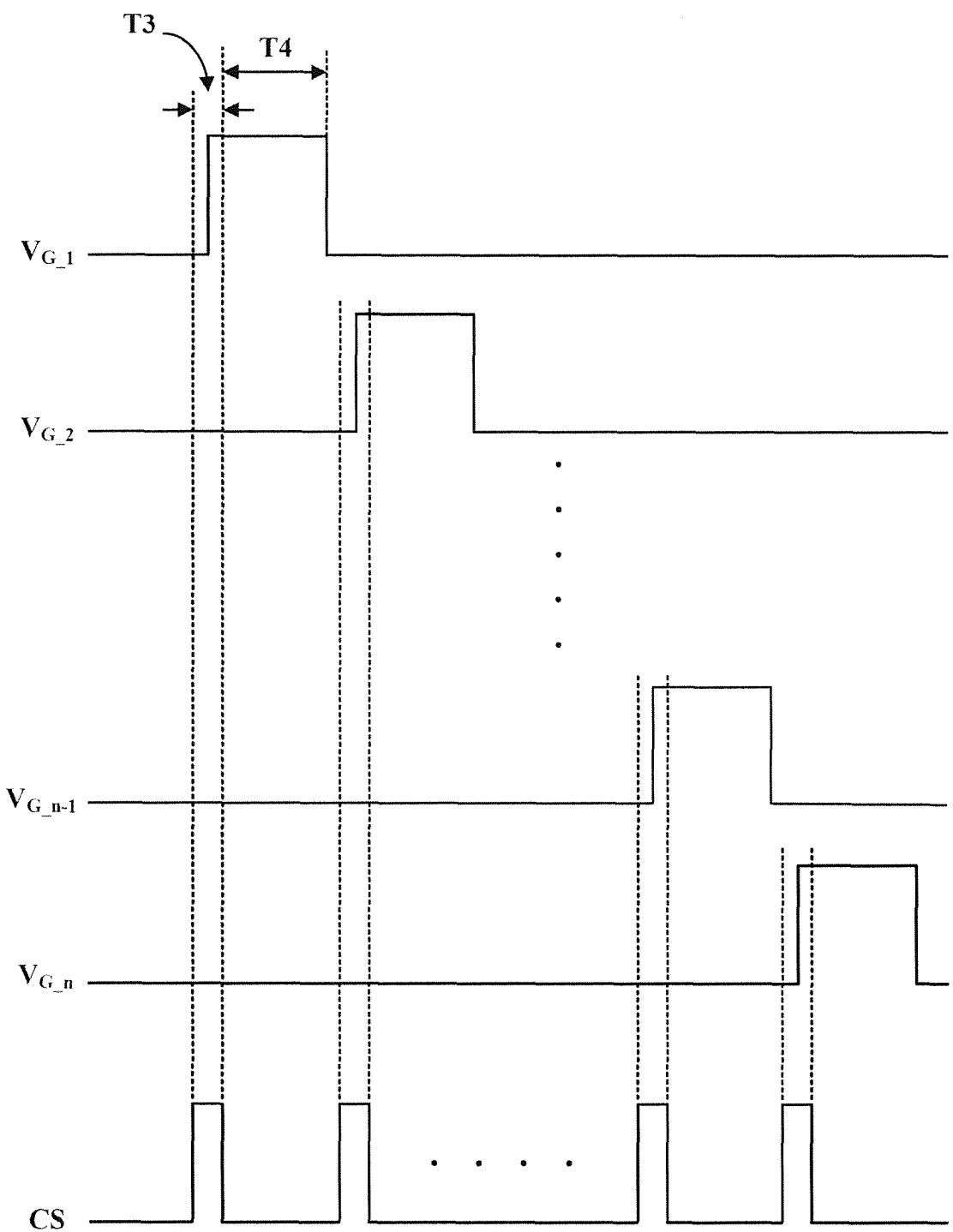
FIG. 4 shows a schematic diagram of the pulses of the scan driving signals in the scan driver according to the first embodiment of the power circuit of displaying device according to the present invention.

Please refer to FIG. 4, which shows a schematic diagram of the pulses of the scan driving signals in the scan driver according to the first embodiment of the power circuit of displaying device according to the present invention. As shown in the figure, the plurality of scan driving signals ($V_{G\_1}$, $V_{G\_2}$ ... $V_{G\_n-1}$, $V_{G\_n}$) are pulse signals. In addition, the rise rate and level of the plurality of scan driving signals ($V_{G\_1}$, $V_{G\_2}$ ... $V_{G\_n-1}$, $V_{G\_n}$) correspond to the rise rate and level of the output voltage $V_{out}$ output by the power circuit 20. Because the plurality of scan driving signals ($V_{G\_1}$, $V_{G\_2}$ ... $V_{G\_n-1}$, $V_{G\_n}$) are generated by the output voltage $V_{out}$ provided by the power circuit 20 with identical operating methods, only the scan driving signal $V_{G\_1}$ is used as an example according to the present embodiment. The rest will not be described again.

In a voltage conversion time T3 of the scan driving signal $V_{G\_1}$, owing to the requirement of raising the scan driving signal $V_{G\_1}$ to a predetermined level from zero volt, the scan driver 15 needs a voltage having higher rise rate than the original output voltage $V_{out}$. Because the rise rate of the scan driving signal $V_{G\_1}$ corresponds to the rise rate of the output voltage $V_{out}$, raising the rise rate of the output voltage $V_{out}$ raises the rise rate of the scan driving signal $V_{G\_1}$. Accordingly, the control circuit 203 outputs the clock signal CLK or the capacitance adjusting signal AP to the charge pump 205 according to the timing control signal CS for increasing the switching frequency of the charge pump 205 or the capacitance of the charging capacitors inside the charge pump 205 and thus improving the rise rate of the output voltage $V_{out}$. Besides, the charge pump 205 outputs the output voltage $V_{out}$ having higher rise rate to the scan driver 15.

Furthermore, in a voltage holding time T4 of the scan driving signal $V_{G\_1}$, owing to the mere requirement of keeping the scan driving signal $V_{G\_1}$ at a predetermined level, the scan driver 15 does not need a voltage having excessively high rise rate or level. Accordingly, the control circuit 203 outputs the clock signal CLK or the capacitance adjusting signal AP to the charge pump 205 according to the timing control signal CS for reducing the switching frequency of the charge pump 205 or the capacitance of the charging capacitors inside the charge pump 205 and thus lowering the rise rate of the output voltage $V_{out}$. Then, the charge pump 205 outputs the output voltage $V_{out}$ with lowered rise rate to the scan driver 15.

Based on the above description, in the voltage conversion time T3, the control circuit 203 outputs the clock signal CLK or the capacitance adjusting signal AP to the charge pump 205 according to the timing control signal CS for increasing the switching frequency or the capacitance of the charging capacitors of the charge pump 205. The switch frequency and the capacitance of the charging capacitors of the charge pump 205 can also be increased simultaneously for increasing the rise rate of the output voltage $V_{out}$. In the voltage holding time T4, the control circuit 203 outputs the clock signal CLK or the capacitance adjusting signal AP to the charge pump 205 according to the timing control signal CS for reducing the switching frequency or the capacitance of the charging capacitors of the charge pump 205. The switch frequency and the capacitance of the charging capacitors of the charge pump 205 can also be reduced simultaneously for reducing the rise rate of the output voltage $V_{out}$.

Figure 5:
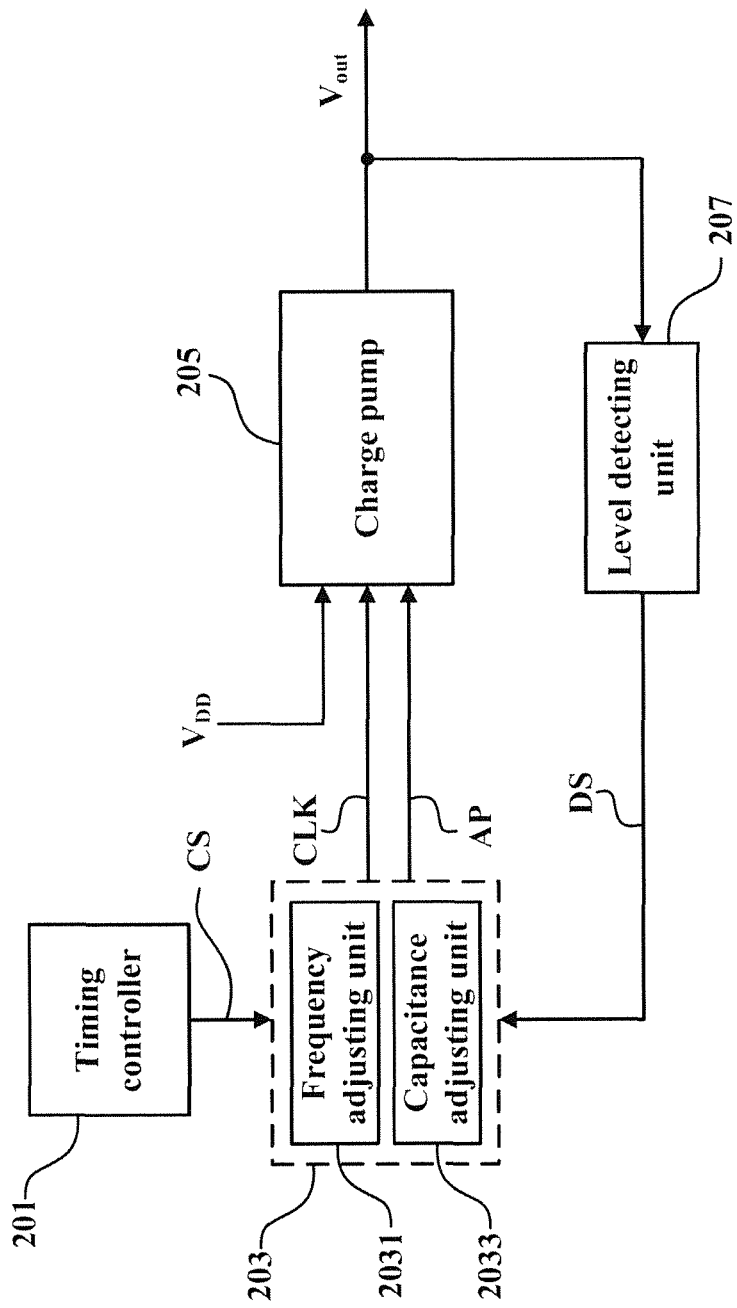
FIG. 5 shows a circuit block diagram of the power circuit of displaying device according to the second embodiment of the present invention.

Please refer to FIG. 5, which shows a circuit block diagram of the power circuit of displaying device according to the second embodiment of the present invention. As shown in the figure, the difference between the present embodiment and the first embodiment is that the present embodiment further comprises a level detecting unit 207. The rest circuits are identical to the first embodiment, and will not be described again. The level detecting unit 207 detects the output voltage $V_{out}$ of the charge pump 205 and outputs a detecting signal DS to the control circuit 203 according to the output voltage $V_{out}$. The control circuit 203 further outputs the clock signal CLK or the capacitance adjusting signal AP according to the detecting signal DS for controlling the switching frequency or the capacitance of the charging capacitors of the charge pump 205. Thereby, the level detecting unit 207 according to the present invention detects the output voltage $V_{out}$ of by the charge pump 205 for controlling the switching frequency or the capacitance of the charging capacitors of the charge pump 205 and thus achieving the purpose of saving power.

The level detecting unit 207 has a threshold value. When the level detecting unit 207 judges that the first output voltage $V_{out}$ is higher than the threshold value, the level detecting unit 207 outputs the detecting signal DS, which makes the control circuit 203 to output the clock signal CLK or the capacitance adjusting signal AP for reducing the switching frequency or the capacitance of the charging capacitors of the charge pump 205. Consequently, the rise rate of the output voltage $V_{out}$ can be reduced.

In addition, the level detecting unit 207 further has a reference value. When the level detecting unit 207 judges that the output voltage $V_{out}$ is lower than the reference value, namely, the output voltage $V_{out}$ is too low, the level detecting unit 207 outputs the detecting signal DS, which makes the control circuit 302 to output the clock signal CLK or the capacitance adjusting signal AP for increasing the switching frequency or the capacitance of the charging capacitors of the charge pump 205. Consequently, the rise rate of the output voltage $V_{out}$ can be increased.

Moreover, when the level detecting unit 207 judges that the output voltage $V_{out}$ is higher than the threshold value, the control circuit 203 can also output the clock signal CLK and the capacitance adjusting signal AP simultaneously for reducing the switching frequency and the capacitance of the charging capacitors of the charge pump 205 simultaneously and thus reducing the rise rate of the output voltage $V_{out}$. When the level detecting unit 207 judges that the output voltage $V_{out}$ is lower than the reference value, the control circuit 203 can also output the clock signal CLK and the capacitance adjusting signal AP simultaneously for increasing the switching frequency and the capacitance of the charging capacitors of the charge pump 205 simultaneously and thus increasing the rise rate of the output voltage $V_{out}$. The threshold value of the level detecting unit 207 can be greater than or equal to the reference value.

Figure 6:
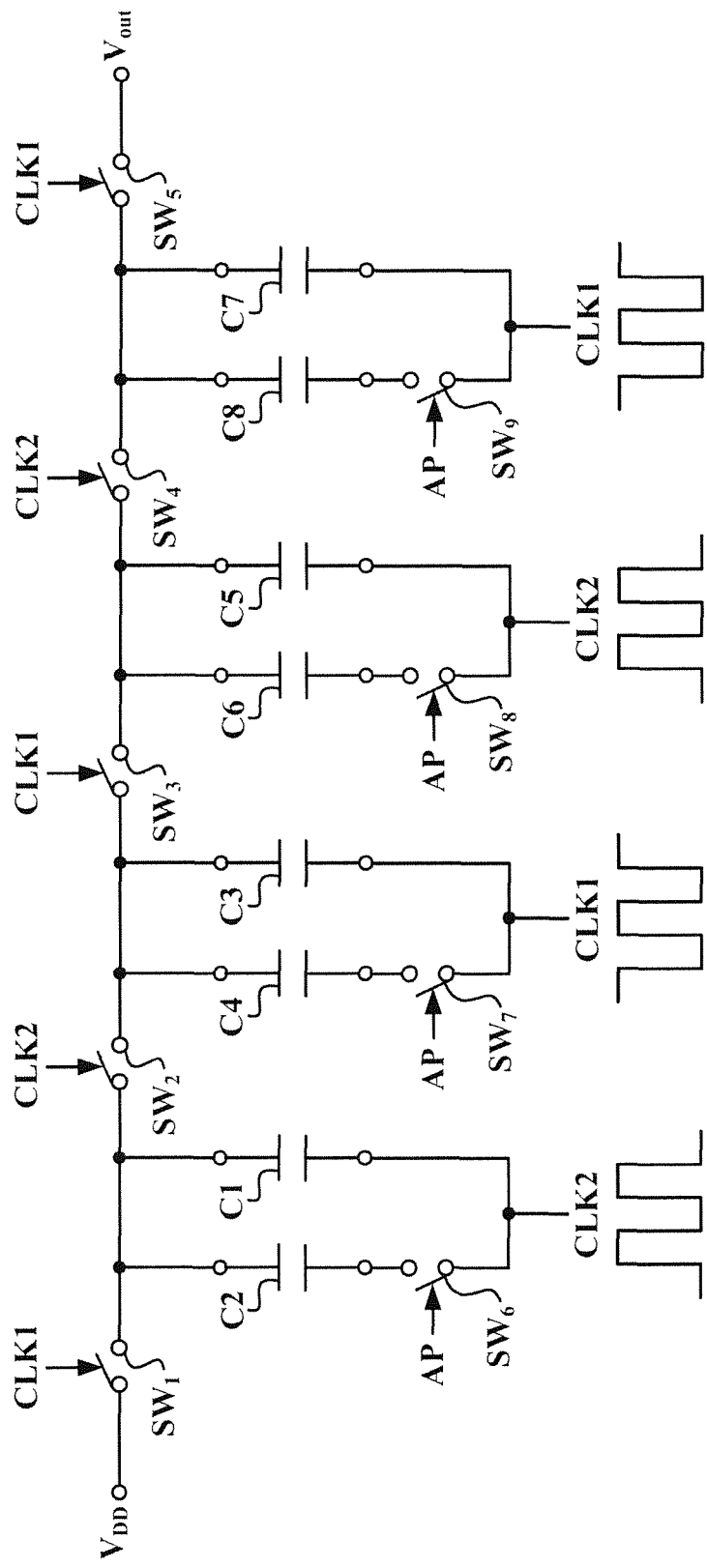
FIG. 6 shows a circuit diagram of the charge pump according to a preferred embodiment of the present invention.

Please refer to FIG. 6, which shows a circuit diagram of the charge pump according to a preferred embodiment of the present invention. As shown in the figure, the charge pump 205 according to the present embodiment comprises a plurality of charging capacitors C1~C8, a plurality of switches SW$_1$~SW$_5$, and a plurality of capacitance switches SW$_6$~SW$_9$. One terminal of the switch SW$_1$ receives the input voltage $V_{DD}$ and the switch SW$_1$ switches according to a clock signal CLK1 of the clock signal CLK. One terminal of the switch SW$_2$ is coupled to the other terminal of the switch SW$_1$ and the switch SW$_2$ switches according to a clock signal CLK2 of the clock signal CLK. One terminal of the switch SW$_3$ is coupled to the other terminal of the switch SW$_2$ and the switch SW$_3$ switches according to the clock signal CLK1. One terminal of the switch SW$_4$ is coupled to the other terminal of the switch SW$_3$ and the switch SW$_4$ switches according to the clock signal CLK2. One terminal of the switch SW$_5$ is coupled to the other terminal of the switch SW$_4$ and the other terminal of the switch SW$_5$ is coupled to the output voltage $V_{out}$, and the switch SW$_5$ switches according to the clock signal CLK1. In addition, the levels of the clock signals CLK1, CLK2 are identical to the input voltage $V_{DD}$; the clock signal CLK1 is the inverse of the clock signal CLK2.

The charging capacitor C1 is coupled between the other terminal of the switch SW$_1$ and the clock signal CLK2. The charging capacitor C2 is connected in parallel with the charging capacitor C1 via the capacitance switch SW$_6$. The charging capacitor C3 is coupled between the other terminal of the switch SW$_2$ and the clock signal CLK1. The charging capacitor C4 is connected in parallel with the charging capacitor C3 via the capacitance switch SW$_7$. The charging capacitor C5 is coupled between the other terminal of the switch SW$_3$ and the clock signal CLK2. The charging capacitor C6 is connected in parallel with the charging capacitor C5 via the capacitance switch SW$_8$. The charging capacitor C7 is coupled between the other terminal of the switch SW$_4$ and the clock signal CLK1. The charging capacitor C8 is connected in parallel with the charging capacitor C7 via the capacitance switch SW$_9$. Besides, the capacitance switches SW$_6$-SW$_9$ are used for switching according to the capacitance adjusting signal AP, and thus adjusting the capacitance values to be used.

When the clock signal CLK1 is high and the clock signal CLK2 is low, the switches SW$_1$, SW$_3$, SW$_5$ are turned on and the switches SW$_2$, SW$_4$ are turned off. At this moment, the capacitance adjusting signal AP is preset to turn on the capacitance switches SW$_6$~SW$_9$. Thereby, the input voltage $V_{DD}$ charges the charging capacitors C1, C2 simultaneously to the voltage level equal to the input voltage $V_{DD}$. On the other hand, when the clock signal CLK1 is turned to low and the clock signal CLK2 is turned to high, the switches SW$_2$, SW$_4$ are turned on and the switches SW$_1$, SW$_3$, SW$_5$ are turned off. At this moment, the voltage across the charging capacitors C1, C2 plus the voltage of the clock signal CLK2 charge the charging capacitors C3, C4 simultaneously to the twofold input voltage $V_{DD}$.

By deducing by analogy, when the clock signal CLK1 is turned again to high and the clock signal CLK2 is turned to low, the voltage across the charging capacitors C3, C4 plus the voltage of the clock signal CLK1 charge the charging capacitors C5, C6 simultaneously to the threefold input voltage $V_{DD}$. When the clock signal CLK1 is turned again to low and the clock signal CLK2 is turned to high, the voltage across the charging capacitors C5, C6 plus the voltage of the clock signal CLK2 charge the charging capacitors C7, C8 simultaneously to the fourfold input voltage $V_{DD}$. When the clock signal CLK1 is turned again to high and the clock signal CLK2 is turned to low, the voltage across the charging capacitors C7, C8 plus the voltage of the clock signal CLK1 give the fivefold input voltage $V_{DD}$, which is used as the output voltage $V_{out}$. According to the above description, the charge pump 205 according to the present embodiment is a circuit structure for fivefold voltage.

Moreover, according to the present embodiment, the frequency adjusting unit 2031 can be used for adjusting the frequency of the clock signals CLK1, CLK2. By adjusting the frequency of the clock signals CLK1, CLK2, the switching frequency of the switches SW$_1$~SW$_5$ is adjusted, and hence adjusting the rise rate of the output voltage $V_{out}$. In addition, the capacitance adjusting signal AP is used for controlling the capacitance switches SW$_6$~SW$_9$ and thus adjusting the capacitance value used while outputting the output voltage $V_{out}$. As the capacitance switches SW$_6$~SW$_9$ are turned on, the capacitance of the charge pump 205 is larger, leading to faster rise rate of the output voltage $V_{out}$. On the contrary, when the capacitance switches SW$_6$~SW$_9$ are turned off, the capacitance of the charge pump 205 is smaller, resulting in slower rise rate of the output voltage $V_{out}$.

Although the power circuit 20 according to the present invention can achieve the effect of adjusting the rise rate of the output voltage $V_{out}$ by adjusting the switching frequency and the capacitance of the charging capacitors of the charge pump 205, the present invention can also adopt one of the methods for adjusting the rise rate of the output voltage $V_{out}$. For example, the control circuit 203 comprises the capacitance adjusting unit 2033 only. Thereby, while adopting the method of adjusting the capacitance only, the switching frequency of the charge pump 205 is fixed.

Figure 7:
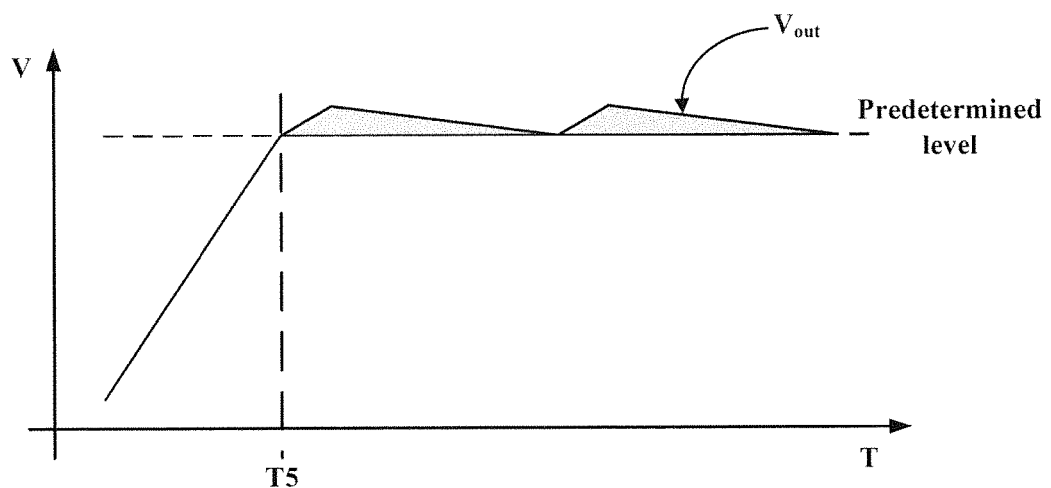
FIG. 7 shows a waveform of the output voltage according to a preferred embodiment of the present invention.

Please refer to FIG. 7, which shows a waveform of the output voltage according to a preferred embodiment of the present invention. As shown in the figure, when the output voltage $V_{out}$ is raised to the predetermined level, namely, in the time T5, the capacitance adjusting unit 2033 outputs the corresponding capacitance adjusting signal AP to the plurality of capacitance switches $SW_6$~$SW_9$ according to the detecting signal DS to turn off the plurality of capacitance switches $SW_6$~$SW_9$. At this moment, only the charging capacitors C1, C3, C5, C7 in the charge pump 205 are used for outputting voltage. Thereby, the rise rate of the output voltage $V_{out}$ is lowered and thus saving power consumption.

Figure 8:
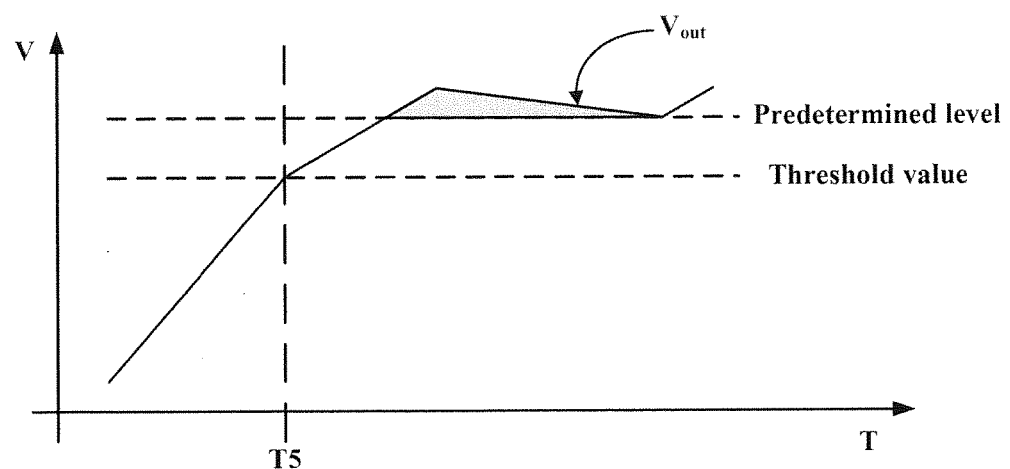
FIG. 8 shows a waveform of the output voltage according to another preferred embodiment of the present invention.

Please refer to FIG. 8, which shows a waveform of the output voltage according to another preferred embodiment of the present invention. As shown in the figure, there is a threshold value set in the present embodiment. As the output voltage $V_{out}$ is raised to threshold value, namely, in the time T5, the capacitance adjusting unit 2033 outputs the corresponding capacitance adjusting signal AP to the plurality of capacitance switches $SW_6$~$SW_9$ according to the detecting signal DS to turn off the plurality of capacitance switches $SW_6$~$SW_9$. At this moment, only the charging capacitors C1, C3, C5, C7 in the charge pump 205 are used for outputting voltage. Thereby, the rise rate of the output voltage $V_{out}$ is lowered and thus saving power consumption. The difference between the present embodiment and the previous one is that according to the present embodiment, before the output voltage $V_{out}$ is raised to the predetermined level, the rise rate of the output voltage $V_{out}$ has been lowered.

The method for adjusting the rise rate of the according to the embodiments in FIGS. 7 and 8 is, as described above, is that the frequency adjusting unit 2031 outputs the corresponding clock signal CLK (CLK1 and CLK2 in FIG. 6) to the plurality of switches $SW_1$~$SW_5$ according to the detecting signal DS. The plurality of switches $SW_1$~$SW_5$ then adjusts the rise rate of the output voltage $V_{out}$ according to the frequency of the clock signal CLK.

Figure 9:
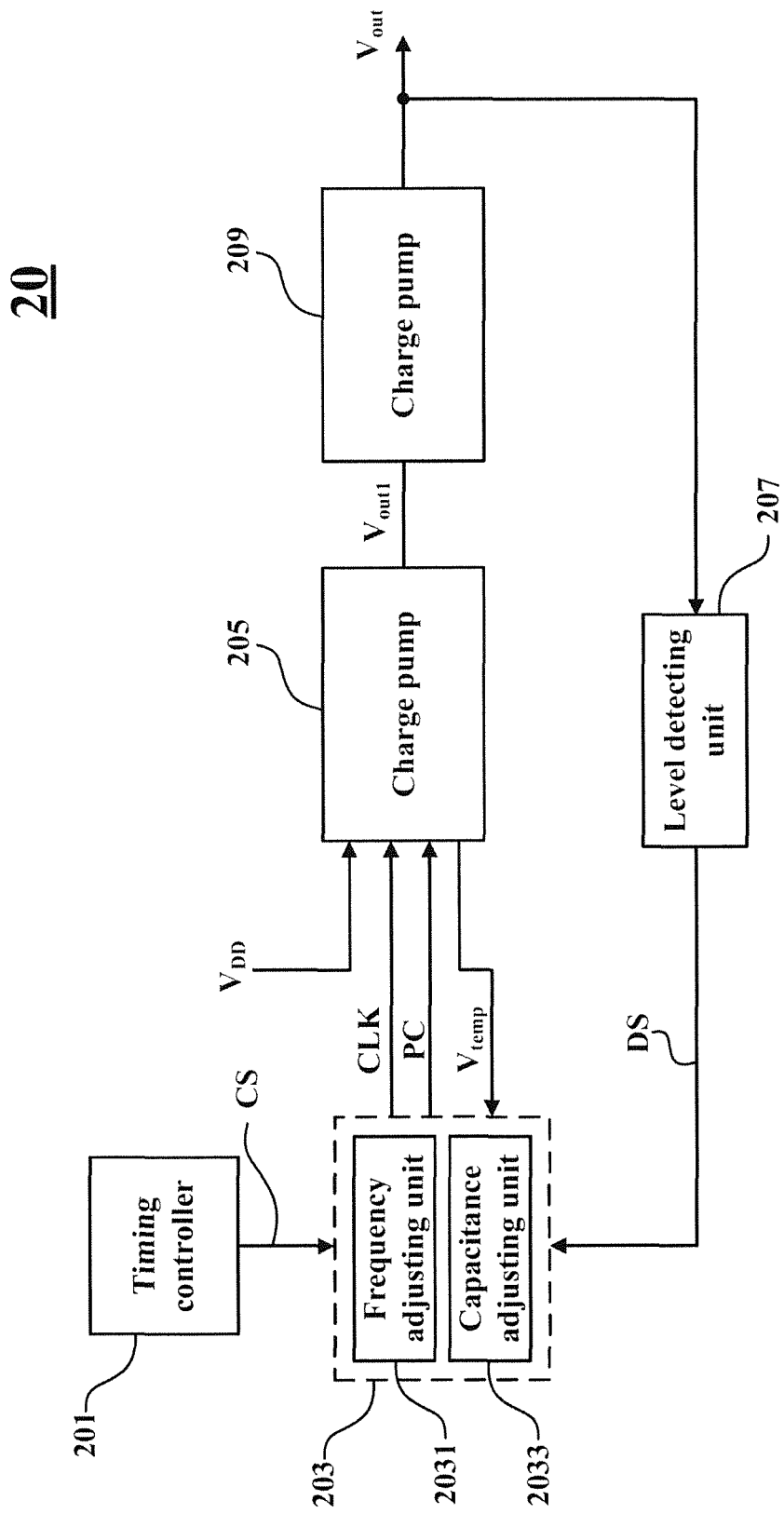
FIG. 9 shows a circuit block diagram of the power circuit of displaying device according to the third embodiment of the present invention.

Please refer to FIG. 9, which shows a circuit block diagram of the power circuit of displaying device according to the third embodiment of the present invention. As shown in the figure, the difference between the present embodiment and the second embodiment is that the power circuit 20 according to the present embodiment is coupled to a plurality of charge pumps 205, 209. In this case, the last stage of the charge pump 209 does not adjust the frequency or multiple; only the previous plurality of charge pumps (in this embodiment, only a single charge pump 205 is used for description) adjust the frequency, multiple, and/or capacitance. In addition, the output of the charge pump 205 is related to a voltage detecting signal $V_{temp}$ of its output voltage $V_{out1}$ for controlling the frequency adjusting unit 2031 and/or the capacitance adjusting unit 2033. Thereby, the frequency adjusting unit 2031 and/or the capacitance adjusting unit 2033 can adjust the frequency or capacitance according to the voltage detecting signal $V_{temp}$.

Figure 10:
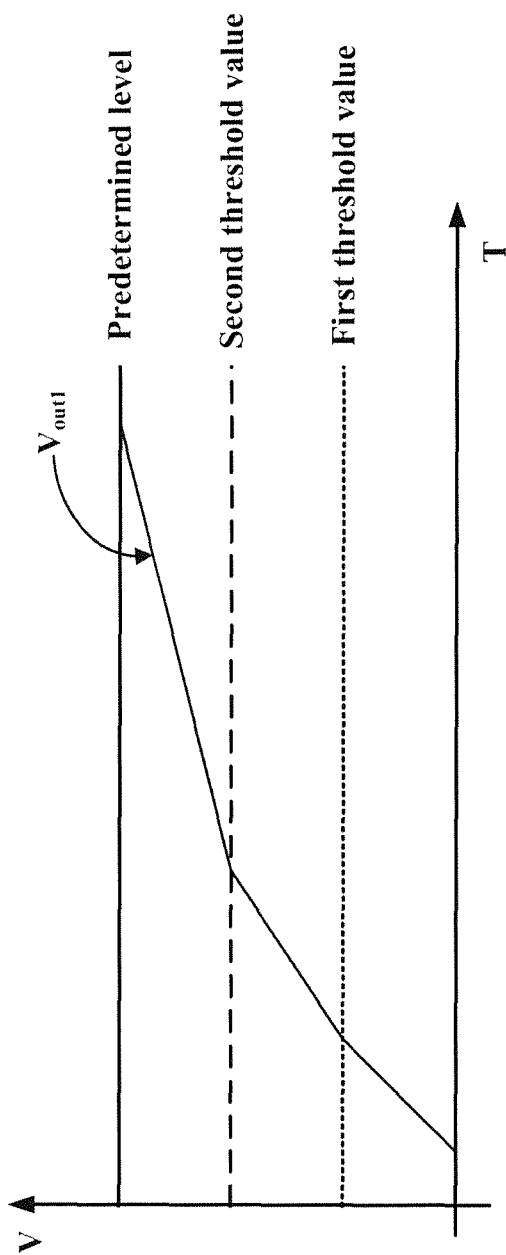
FIG. 10 shows a waveform of the output voltage according to the third embodiment of the present invention.

Please refer to FIG. 10, which shows a waveform of the output voltage according to the third embodiment of the present invention. As shown in the figure, when the output voltage $V_{out}$ is raised to the first threshold value, the frequency adjusting unit 2031 and/or the capacitance adjusting unit 2033 lower the switching frequency and/or the capacitance of the charging capacitors of the charge pump 205 according to the voltage detecting signal $V_{temp}$ for lowering the rise rate of the output voltage $V_{out1}$. When the output voltage $V_{out1}$ is raised to the second threshold value, the switching frequency and/or the capacitance of the charging capacitors of the charge pump 205 are reduced again for further lowering the rise rate of the output voltage $V_{out1}$.

Figure 11:
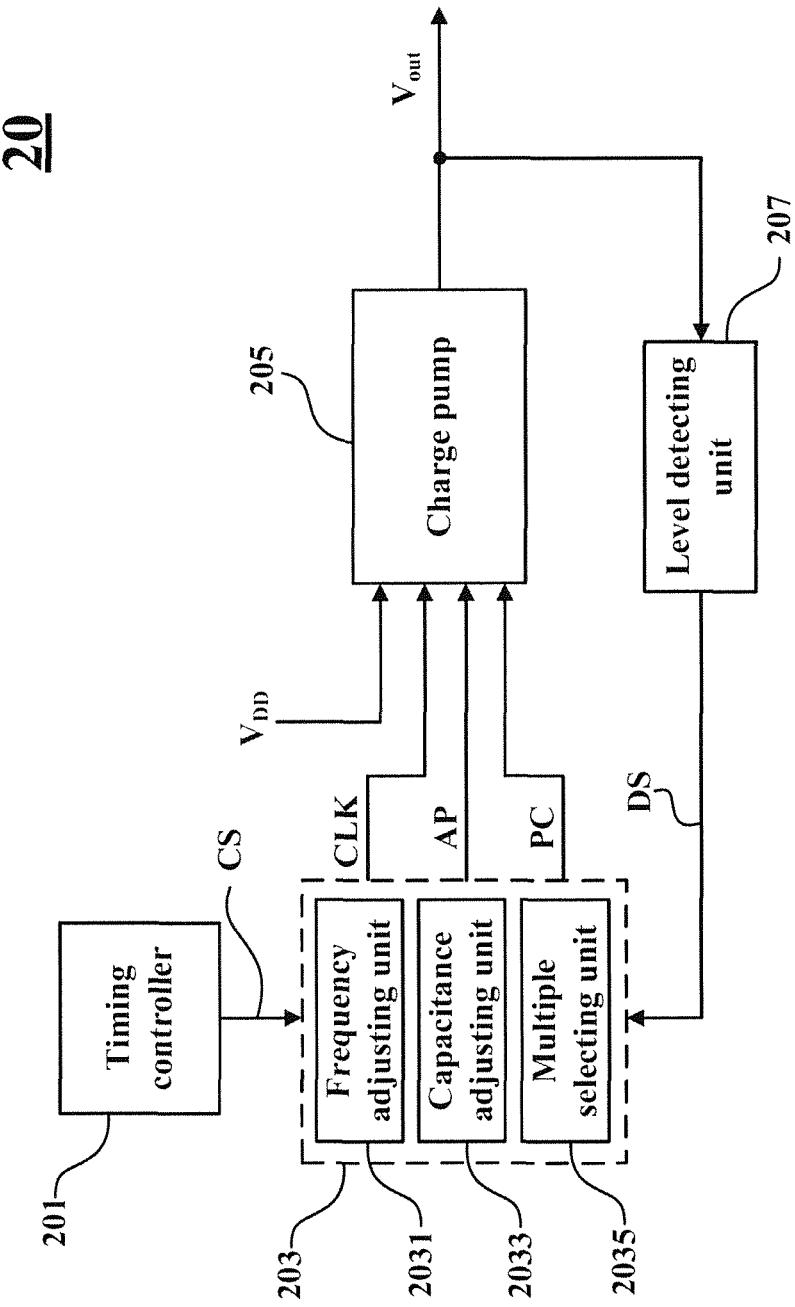
FIG. 11 shows a circuit block diagram of the power circuit of displaying device according to the fourth embodiment of the present invention.

Please refer to FIG. 11, which shows a circuit block diagram of the power circuit of displaying device according to the fourth embodiment of the present invention. As shown in the figure, the difference between the present embodiment and the second embodiment is that the control circuit 203 according to the present embodiment further comprises a multiple selecting unit 2035. The rest circuits are identical to those according to the second embodiment. Hence, the details will not be described again. As shown in the figure, the multiple selecting unit 2035 can output the multiple adjusting signal PC according to timing control signal CS of the timing controller 201 or the detecting signal DS of the level detecting unit 207 for adjusting the multiple of the charge pump 205. Thereby, the voltage level of the output voltage $V_{out}$ can be adjusted, which, in turn, adjusts the rise rate of the output voltage $V_{out}$.

Figure 12:
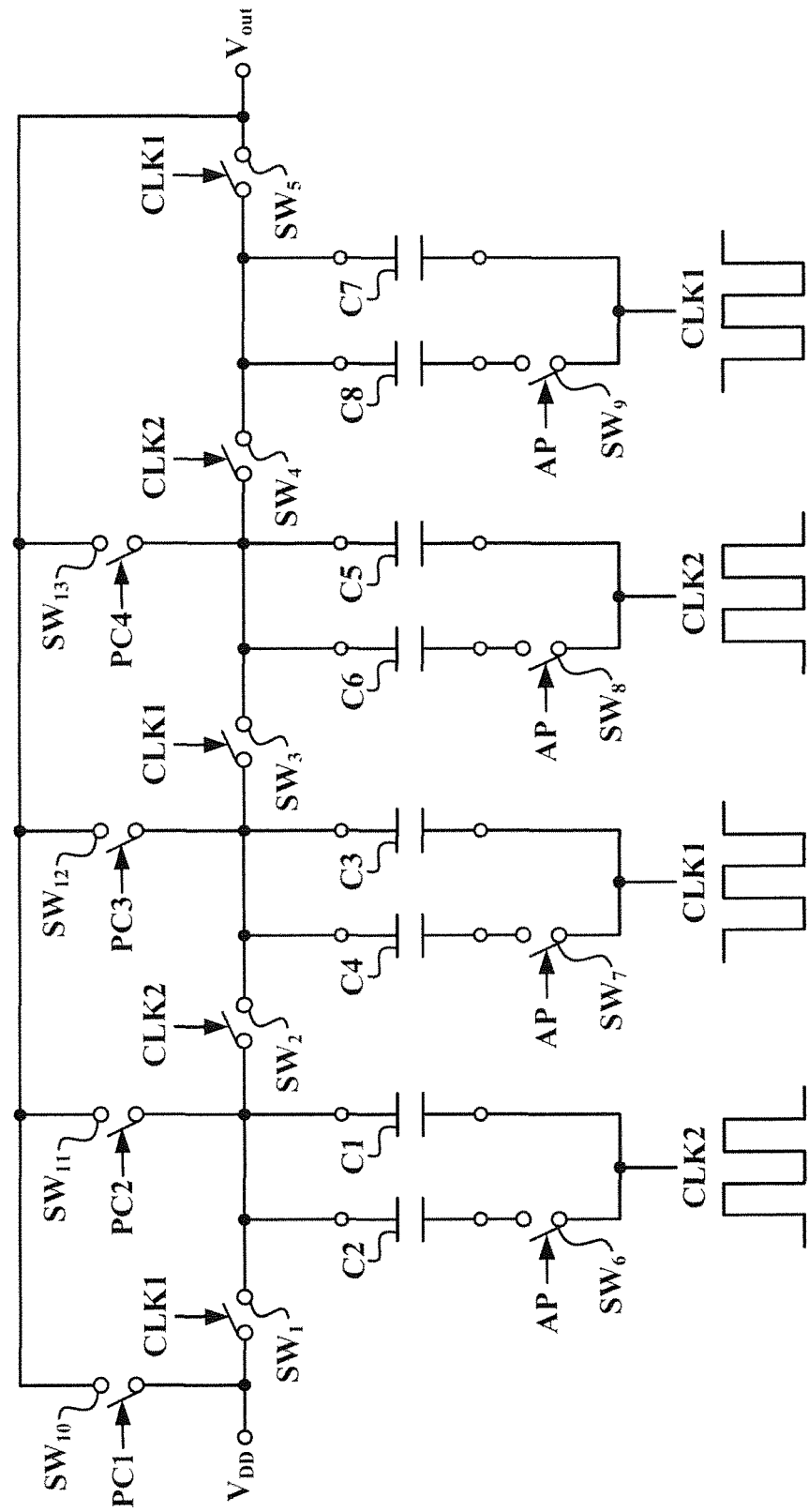
FIG. 12 shows a circuit diagram of the charge pump according to another preferred embodiment of the present invention.

Please refer to FIG. 12, which shows a circuit diagram of the charge pump according to another preferred embodiment of the present invention. The difference between the present embodiment and the one in FIG. 6 is that the present embodiment further comprises a plurality of multiple switches $SW_{10}$~$SW_{13}$. The multiple switch $SW_{10}$ is coupled between the input voltage $V_{DD}$ and the output voltage $V_{out}$. The multiple switch $SW_{11}$ is coupled between the other terminal of the switch $SW_1$ and the output voltage $V_{out}$. The multiple switch $SW_{12}$ is coupled between the other terminal of the switch $SW_2$ and the output voltage $V_{out}$. The multiple switch $SW_{13}$ is coupled between the other terminal of the switch $SW_3$ and the output voltage $V_{out}$. The multiple switches $SW_{10}$~$SW_{13}$ switch according to the multiple adjusting signals PC1~PC4 of the multiple adjusting signal PC, respectively.

In addition, according to the present embodiment, the multiple adjusting signals PC1~PC4 of the multiple adjusting signal PC can be used for controlling the multiple switches $SW_{10}$~$SW_{13}$. Thereby, the output can be coupled to different nodes and the output voltage $V_{out}$ can thus be the onefold to fivefold input voltage $V_{DD}$. Consequently, the rise rate of the output voltage $V_{out}$ can be adjusted by different multiples.

To sum up, the present invention provides a power circuit of displaying device. The rise rate of the output voltage provided by the power circuit can be increased by increasing the switching frequency or capacitance of the charge pump of the power circuit in the voltage conversion time of the scan driving signal. Hence, the scan driver can have voltages with sufficient rise rate in the voltage conversion time of the scan driving signal. The rise rate of the output voltage provided by the power circuit can be reduced by lowering the switching frequency or capacitance of the charge pump of the power circuit in the voltage holding time of the scan driving signal. Hence, the power consumption of the power circuit can be reduced in the voltage holding time of the scan driving signal. Moreover, the level detecting circuit is used for detecting the output voltage of the charge pump for controlling the switching frequency or capacitance of the charge pump. According to the present invention, the switching frequency or capacitance of the charge pump of the power circuit is increased in the voltage conversion time only and is lowered in the voltage holding time for controlling the switching frequency or capacitance of the charge pump. Thereby, the effect of reducing power consumption can be achieved.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A power circuit of a displaying device, comprising:
a timing controller, outputting a timing control signal, and said timing of said timing control signal related to a plurality of scan driving signals of said displaying device;
a control circuit, receiving said timing control signal from said timing controller, said control circuit:
generating a first clock signal and a second clock signal according to said timing control signal, wherein said first and said second clock signals are different from each other; and
further generating a capacitance adjusting signal according to said timing control signal; said
capacitance adjusting signal controlling the capacitance of a charge pump by connecting or disconnecting a plurality of charging capacitors selectively interconnected inside said charge pump;
said charge pump being selectively altered in capacitance value responsive to said capacitance adjusting signal, said charge pump including a plurality of consecutive charging stages respectively interconnected by a plurality of interconnection switches, each of said consecutive charging stages including one of said charging capacitors and at least one other of said charging capacitors selectively interconnected in parallel thereto by a capacitance switch;
said charge pump receiving an input voltage, producing an output voltage according to said capacitance adjusting signal, said consecutive charging stages being alternately coupled to one of said first and second clock signals and interconnected by respective ones of said interconnection switches each controlled by one of said first and second clock signals;
wherein adjacent interconnection switches are controlled by different ones of said first and second clock signals, and said charging capacitors of adjacent consecutive charging stages are connected with different ones of said first and second clock signals;
wherein each of said consecutive charging stages further includes said capacitance switch located in between said one of said charging capacitors and said at least one other of said charging capacitors with one of said first and second clock signals coupled between said capacitance switch and said one of said charging capacitors, and said capacitance switch is controlled by said capacitance adjusting signal.

2. The power circuit of claim 1, and further comprising a level detecting unit, detecting said output voltage, outputting a detecting signal to said control circuit according to said output voltage, and said control circuit further outputting said first clock signal, said second clock signal or said capacitance adjusting signal according to said detecting signal for controlling said switching frequency of said charge pump or said capacitance of said charge pump.

3. The power circuit of claim 2, wherein said level detecting unit has a threshold value, and when said level detecting unit judges that said output voltage is higher than said threshold value, said level detecting unit outputs said detecting signal for enabling said control circuit to output said first clock signal and said second clock signal for reducing said switching frequency or to output said capacitance adjusting signal for reducing said capacitance of said plurality of charging capacitors of said charge pump.

4. The power circuit of claim 2, wherein said level detecting unit has a reference value, and when said level detecting unit judges that said output voltage is lower than said reference value, said level detecting unit outputs said detecting signal for enabling said control circuit to output said first clock signal and said second clock signal for increasing said switching frequency or to output said capacitance adjusting signal for increasing said capacitance of said charge pump.

5. The power circuit of claim 1, wherein said power circuit outputs said output voltage to a scan driver for enabling said scan driver to generate said plurality of scan driving signals.

6. The power circuit of claim 5, wherein in a voltage conversion time of said plurality of scan driving signals, said control circuit outputs said first clock signal, said second clock signal or said capacitance adjusting signal to said charge pump according to said timing control signal for increasing said switching frequency of said charge pump or said capacitance of said charge pump.

7. The power circuit of claim 5, wherein in a voltage holding time of said plurality of scan driving signals, said control circuit outputs said first clock signal, said second clock signal or said capacitance adjusting signal to said charge pump according to said timing control signal for reducing said switching frequency of said charge pump or said capacitance of said charge pump.

8. The power circuit of claim 1, wherein said switching frequency and said capacitance of said charge pump correspond to the rising rate of said output voltage.

9. The power circuit of claim 1, wherein said control circuit generates a multiple adjusting signal according to said timing control signal; said charge pump produces said output voltage according to said multiple adjusting signal; and said multiple adjusting signal determines a multiple between said input voltage and said output voltage.

\* \* \* \* \*